United States Patent
Nam et al.

(10) Patent No.: US 9,846,956 B2
(45) Date of Patent: Dec. 19, 2017

(54) METHODS, SYSTEMS AND COMPUTER-READABLE MEDIUMS FOR EFFICIENT CREATION OF IMAGE COLLAGES

(71) Applicant: LINE Corporation, Tokyo (JP)

(72) Inventors: Se Dong Nam, Seongnam-si (KR); Chang Young Jeong, Seongnam-si (KR); Sang Cheol Jeon, Seongnam-si (KR); Young Hun Kim, Seongnam-si (KR)

(73) Assignee: Line Corporation, Tokyo (JP)

( * ) Notice: Subject to any disclaimer, the term of this patent is extended or adjusted under 35 U.S.C. 154(b) by 246 days.

(21) Appl. No.: 14/825,465

(22) Filed: Aug. 13, 2015

(65) Prior Publication Data

US 2016/0267634 A1     Sep. 15, 2016

(30) Foreign Application Priority Data

Mar. 12, 2015     (KR) .................. 10-2015-0034658

(51) Int. Cl.
   *G06T 11/60*     (2006.01)
   *G06K 9/00*     (2006.01)
   *G06K 9/32*     (2006.01)

(52) U.S. Cl.
   CPC .......... *G06T 11/60* (2013.01); *G06K 9/00369* (2013.01); *G06K 9/00684* (2013.01); *G06K 9/3216* (2013.01); *G06K 9/00228* (2013.01)

(58) Field of Classification Search
   CPC ... G06T 5/50; G06T 5/20; G06T 11/60; G06T 2207/20221; H04N 7/183; G06K 9/00228; G06K 9/00369; G06K 9/00684; G06K 9/3216
   See application file for complete search history.

(56) References Cited

U.S. PATENT DOCUMENTS

| | | | |
|---|---|---|---|
| 2005/0062869 A1* | 3/2005 | Zimmermann | G02B 13/06 348/335 |
| 2008/0043112 A1 | 2/2008 | Nikkanen et al. | |
| 2008/0205789 A1 | 8/2008 | Ten Kate et al. | |

(Continued)

FOREIGN PATENT DOCUMENTS

| | | |
|---|---|---|
| JP | 2013150272 A | 8/2013 |
| JP | 2015036807 A | 2/2015 |

(Continued)

OTHER PUBLICATIONS

Notice of Allowance for corresponding Korean Application No. 10-2015-0034658 dated Nov. 27, 2015.

(Continued)

*Primary Examiner* — Luong T Nguyen

(74) *Attorney, Agent, or Firm* — Harness, Dickey & Pierce, P.L.C.

(57) ABSTRACT

In one example embodiment, an image providing method includes capturing, by a processor, a first partial image while applying a first image processing filter at a first time, capturing, by the processor, a second partial image while applying a second image filter at a second time after the first time, and generating, by the processor, a collage image by merging the first partial image and the second partial image at a third time after the second time.

18 Claims, 7 Drawing Sheets

(56) References Cited

U.S. PATENT DOCUMENTS

| | | | | |
|---|---|---|---|---|
| 2011/0117532 A1* | 5/2011 | Relyea | ................... | G01J 3/02 |
| | | | | 434/307 R |
| 2011/0285748 A1* | 11/2011 | Slatter | ................... | G06T 11/60 |
| | | | | 345/629 |
| 2011/0292420 A1* | 12/2011 | Dungan | ................ | G06T 11/60 |
| | | | | 358/1.9 |
| 2012/0147046 A1* | 6/2012 | Chao | ................... | G06Q 50/10 |
| | | | | 345/641 |

FOREIGN PATENT DOCUMENTS

| KR | 20070097552 A | 10/2007 |
|---|---|---|
| KR | 1020070108195 A | 11/2007 |

OTHER PUBLICATIONS

Office Action for corresponding Korean Patent Application No. 10-2015-0034658 dated Sep. 18, 2015.

\* cited by examiner

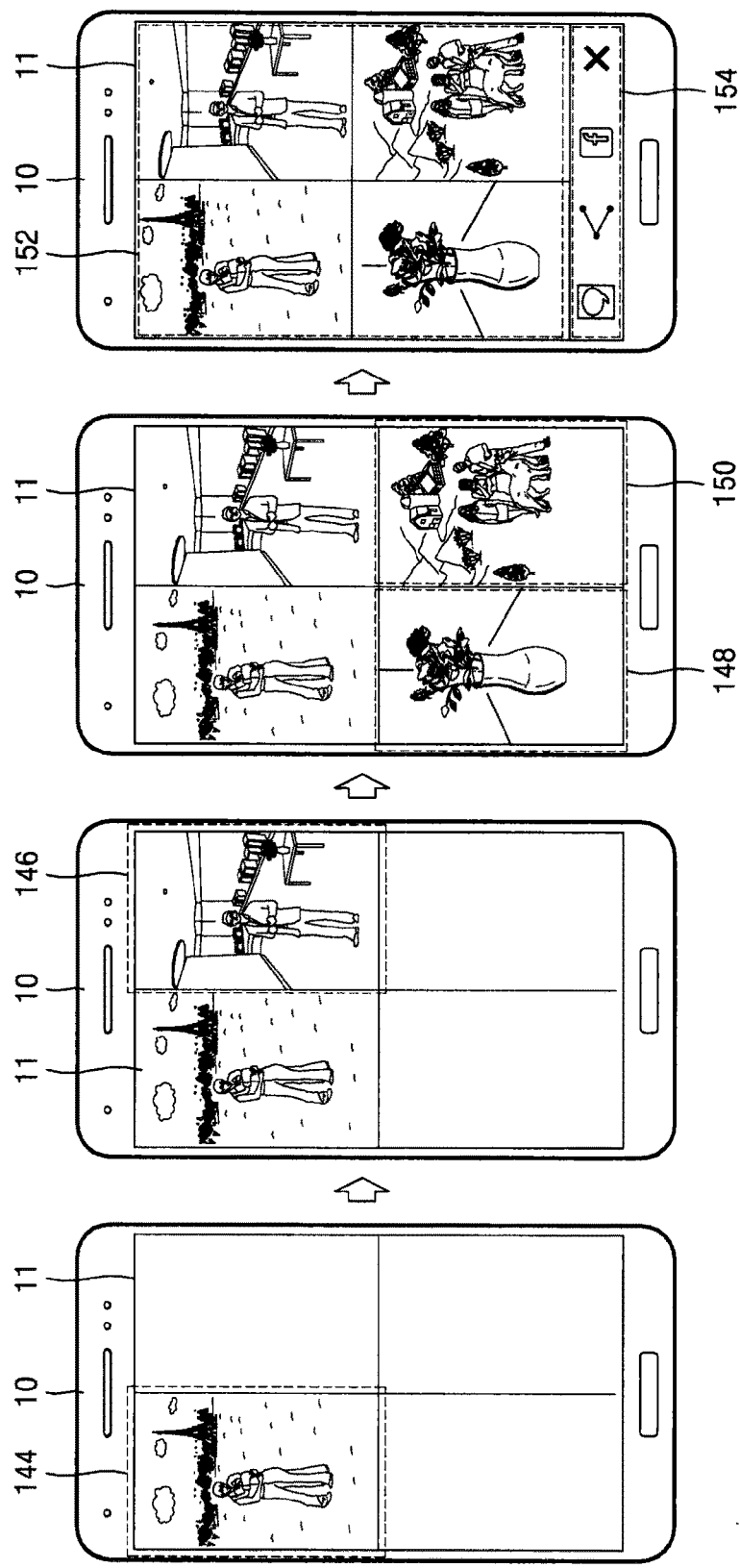

METHODS, SYSTEMS AND COMPUTER-READABLE MEDIUMS FOR EFFICIENT CREATION OF IMAGE COLLAGES

CROSS-REFERENCE TO RELATED APPLICATION

This application claims the benefit of Korean Patent Application No. 10-2015-0034658, filed on Mar. 12, 2015, in the Korean Intellectual Property Office, the disclosure of which is incorporated herein in its entirety by reference.

BACKGROUND

1. Field

One or more example embodiments relate to an image providing method and/or an image providing device.

2. Description of the Related Art

A collage image is an image including a plurality of images connected to one another. Such a collage image is practical as various types of image information may be transmitted via one image and is also aesthetic as the collage image itself is visually attractive.

Meanwhile, according to development of image capturing technologies and image processing technologies, methods of capturing an image and/or post-processing a captured image by using various image processing algorithms have been developed.

SUMMARY

One or more example embodiments include an image providing method and/or an image providing device, which capture a plurality of images and generate a collage image by applying same or different image processing filters to the plurality of images.

One or more example embodiments include an image providing method and/or an image providing device, which pre-determine resolution, bit rate, or frame per second of each of a plurality of images that are to form a collage image, and generate a collage image by capturing a plurality of images corresponding to the pre-determined resolution, bit rate, or frame per second.

One or more example embodiments include an image providing method and/or an image providing device, which apply various image processing filters to at least one of a person region and a background region in a captured image.

Additional aspects will be set forth in part in the description which follows and, in part, will be apparent from the description, or may be learned by practice of the presented example embodiments.

In one example embodiment, an image providing method includes capturing, by a processor, a first partial image while applying a first image processing filter at a first time, capturing, by the processor, a second partial image while applying a second image filter at a second time after the first time and generating, by the processor, a collage image by merging the first partial image and the second partial image at a third time after the second time.

In yet another example embodiment, the image providing method further includes determining, by the processor, a shape of each of the first and second partial images included in the collage image before the capturing of the first partial image, and determining, by the processor, at least one of a resolution, a bit rate, and a frame per second of each of the first and second partial images based on the determined shape. Each of the capturing of the first partial image and the capturing the second partial image is performed based on the determined at least one of the resolution, the bit rate, and the frame per second of the corresponding one of the first and second partial images.

In yet another example embodiment, the determining the shape includes receiving, an input for selecting at least one collage pattern, and determining the shape of each of the first partial image and the second partial image according to the selected collage pattern.

In yet another example embodiment, each of the capturing the first partial image and the capturing the second partial image captures the corresponding one of the first partial image and the second partial image by applying at least one effect based on the determined shape of the first partial image and the second partial image, the at least one effect being selected from among an image cropping effect, and image rotating effect, and image size effect and a proportion scaling effect.

In yet another example embodiment, the generating the collage image includes generating the collage image by applying at least one effect to each of the first and second partial images based on the determined shape of the first partial image and the second partial image, the at least one effect being selected from among an image cropping effect, and image rotating effect, and image rotating effect, and image size effect and a proportion scaling effect.

In yet another example embodiment, the determining the at least one of the resolution, the bit rate, and the frame per second determines at least one of the resolution and the bit rate of each of the first and second partial images in proportion to an area of each of the first and second partial images.

In yet another example embodiment, the determining the at least one of the resolution, the bit rate, and the frame per second determines at least one of the resolution, the bit rate, and the frame per second of each of the partial images based on a performance of at least one of an apparatus capturing the first and second partial images, an apparatus generating the collage image, and an apparatus for reproducing the collage image.

In yet another example embodiment, each of the capturing the first partial image and the capturing the second partial image includes recognizing a face from a photography area of at least one of the first partial image and the second partial image, predicting a body region of a person having the recognized face in the at least one of the first partial image and the second partial image, based on the recognized face, and applying an image processing filter to at least one region from among the body region and a remaining region obtained by excluding the body region from the photography area of the at least one of the first partial image and the second partial image.

In yet another example embodiment, the image providing method further includes decoding, by the processor, the first partial image after the capturing of the first partial image. A period of time during which the decoding decodes the first partial image at least partially overlaps with a period of time during which the capturing the second partial image captures the second partial.

In yet another example embodiment, the image providing method further includes deleting the first partial image when the capturing the second partial image does not initiate capturing the second partial image within a first threshold time after the first time.

In yet another example embodiment, each of the first and second partial images is a still image or a moving image.

In yet another example embodiment, the first partial image is one of a still image and a moving image, and the second partial image is the other one of the still image and the moving image.

In yet another example embodiment, the first and second partial images are moving images captured simultaneously.

In yet another example embodiment, a resolution of the collage image is equal to a sum of a resolution of the first partial image and a resolution of the second partial image.

In yet another example embodiment, the image providing method further includes, capturing a third partial image while applying a third image processing filter at a fourth time after the second time after the capturing of the first partial image. The generating the collage image includes generating the collage image by merging the first partial image, the second partial image and the third partial images at the third time after the fourth time.

In one example embodiment, a non-transitory computer-readable medium stores instructions which when executed by a processor, causes the processor to perform capturing a first partial image while applying a first image processing filter at a first time, capturing a second partial image while applying a second image filter at a second time after the first time and generating a collage image by merging the first partial image and the second partial image at a third time after the second time.

In one example embodiment, an image providing device includes a memory having computer-readable instructions stored therein, and a processor. The processor is configured to execute the computer-readable instructions to capture a first partial image while applying a first image processing filter at a first time, capture a second partial image while applying a second image filter at a second time after the first time, and generate a collage image by merging the first partial image and the second partial image at a third time after the second time.

In yet another example embodiment, the processor is further configured to determine a shape of each of the first and second partial images, determine at least one of a resolution, a bit rate, and a frame per second of each of the first and second partial images based on the determined shape, and capture the first and second partial images based on the determined at least one of the resolution, the bit rate, and the frame per second.

In yet another example embodiment, the processor is further configured to recognize a face from a photography area of at least one of the first partial image and the second partial image while capturing each of the first and second partial images, predict a body region of a person having the recognized face based on the recognized face in the at least one of the first partial image and the second partial image, and apply an image processing filter to at least one region from among the predicted body region and a remaining region obtained by excluding the predicted body region from the photography area of the at least one of the first partial image and the second partial image.

In yet another example embodiment, the image processor is further configured to decode the first partial image. A period of time during which the processor decodes the first partial image overlaps at least partially with a period of time during which the processor captures the second partial image may.

These general and specific example embodiments may be implemented by using a system, a method, a computer program, or a combination of the system, the method, and the computer program.

BRIEF DESCRIPTION OF THE DRAWINGS

These and/or other aspects will become apparent and more readily appreciated from the following description of the embodiments, taken in conjunction with the accompanying drawings in which:

FIGS. 5A-D, 6, 7A-D and 8A-C are diagrams for describing examples of an image providing method performed by an image providing device, according to example embodiments.

DETAILED DESCRIPTION OF EXAMPLE EMBODIMENTS

Figure 1:
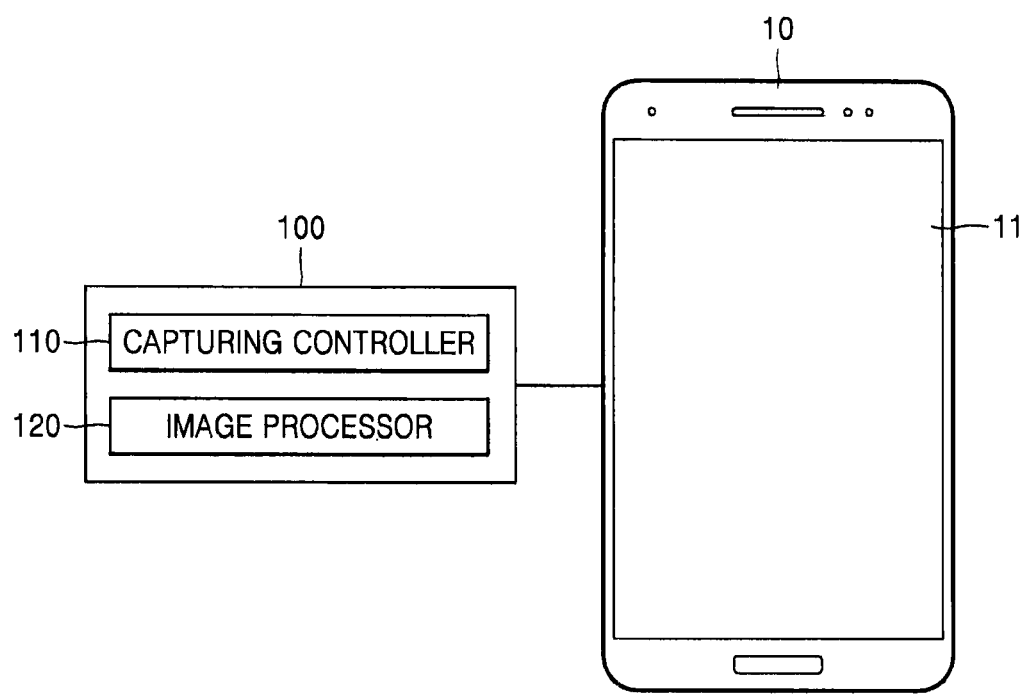
FIG. 1 is a diagram schematically illustrating an image providing device according to an example embodiment.

Reference will now be made in detail to example embodiments, which are illustrated in the accompanying drawings. In this regard, the present example embodiments may have different forms and should not be construed as being limited to the descriptions set forth herein. Accordingly, the example embodiments are merely described below, by referring to the figures, to explain aspects of the present description.

It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following example embodiments are not limited thereto.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more example embodiments will be described in detail with reference to accompanying drawings. In drawings, like reference numerals refer to like elements throughout and overlapping descriptions shall not be repeated.

FIG. 1 is a diagram schematically illustrating an image providing device 100 according to an example embodiment.

The image providing device 100 according to an example embodiment may correspond to at least one processor or include at least one processor. The term 'processor' may denote, for example, a data processing apparatus having a hardware structure including a physically structured circuits configured to process and/or execute functions expressed as a code or command of a program (computer-readable program of software), thus transforming the processor into a special purpose processor for carrying out the underlying functions described herein. Examples of the data processing apparatus embedded having a hardware structured may include a microprocessor, a central processing unit (CPU), a processor core, a multiprocessor, an application specific integrated circuit (ASIC), a field programmable gate array (FPGA), but are not limited thereto.

The image providing device 100 may be driven while being included in another hardware apparatus, such as a microprocessor, a general-purpose computer system, or an image capturing apparatus. For example, the image providing device 100 may be mounted on a terminal 10 including a display unit 11, or may be a separate device connected to the terminal 10 via wires or wirelessly. Alternatively, the image providing device 100 may be the terminal 10 itself. At this time, the terminal 10 may be at least any one of, but not limited to, a smart phone, a personal computer (PC), a tablet PC, a smart television (TV), a mobile phone, a personal digital assistant (PDA), a laptop, a media player, a microserver, a global positioning system (GPS) apparatus, an electronic book terminal, a digital broadcasting terminal, a navigation, a kiosk, an MP3 player, a compact camera, a digital single lens reflex camera (DSRL), a mirrorless camera, a hybrid camera, a wearable device, and other mobile or non-mobile computing apparatuses.

To prevent features of the current example embodiment from being obscured, only components of the image providing device 100 related to the current example embodiment are shown in FIG. 1. Accordingly, it would be obvious to one of ordinary skill in the art that the image providing device 100 may further include general-purpose components other than those shown in FIG. 1.

Referring to FIG. 1, the image providing device 100 according to an example embodiment may control the terminal 10. Also, the image providing device 100 may control display of the display unit 11 of the terminal 10. The image providing device 100 according to an example embodiment may capture an image or control the terminal 10 to capture an image. Also, the image providing device 100 may apply various types of image processing technologies to a captured image, or control the terminal 100 to apply various types of image processing technologies to a captured image. Also, the image providing device 100 may control the terminal 10 to display, on the display unit 11, an image to be captured, a captured image, a result image expected when an image processing technology is applied, or a result image obtained when an image processing technology is applied. Such an image providing device 100 according to an example embodiment may include a capturing controller 110 and an image processor 120. In one example embodiment, the image providing device 100 and/or the terminal 10 may include a processor configured to carry out the functionalities of each of the capturing controller 110 and image processor 120, as will be described below.

The capturing controller 110 may directly capture an image or control the terminal 10 to capture an image. Hereinafter, when it is described that the capturing controller 110 captures an image, the capturing controller 110 may directly capture an image or may control the terminal 10 to capture an image.

The capturing controller 110 may include an optical unit or an image pickup device. The capturing controller 110 may receive light through the optical unit or may convert light into an electric image signal through the image pickup device. Alternatively, the capturing controller 110 may control an optical unit or an image pickup device included in the terminal 10 so as to control the terminal 10 to receive light and convert the light into an electric image signal.

The capturing controller 110 may capture a plurality of partial images at different times. For example, the capturing controller 110 may capture a first partial image at a first time. Then, the capturing controller 110 may capture a second partial image at a second time after the first time. While capturing each of partial images, the capturing controller 110 may capture the partial images while applying image processing filters. Here, types of the image processing filters may be different or same according to the partial images. In other words, the capturing controller 110 may capture the first partial image while applying a first image processing filter effect at the first time, and then capture the second partial image while applying a second image processing filter effect at the second time after the first time. In addition, the capturing controller 110 may capture at least three partial images at different times, or may capture an image by applying the same or different image processing filters to each of partial images. A method of capturing, by the capturing controller 110, a plurality of partial images at different times will be described later with reference to FIGS. 5 and 6.

Here, an image processing filter effect may be, without limitation, any general filter effect applied to a captured photograph or a captured moving image. For example, an image processing filter effect may be an effect obtained by applying a low pass filter applicable to a spatial domain or a frequency domain, a high pass filter, a band pass filter, or a band reject filter. In addition, an image processing filter effect may be any one of various image processing filter effects obtained by applying an averaging filter, a median filer, a Gaussian filter, an edge detection filter, an edge enhancement filter, an edge blurring filer, a smoothing spatial filter, and a sharpening spatial filter, and may further be any type of image processing filter effect. In order to obtain such an image processing filter effect, any one of various pre-process effects, post-process effects, and assisting effects, such as Fourier transform, wavelet transform, image segmentation, and object recognition, may be applied to an image, as well as other types of image processing technologies. By using various types of image processing technologies, various manipulation effects may be applied while capturing an image, for example, blurring an entire or partial region of the image, sharpening the image, adjusting brightness of the image, changing a color sense of the image, changing the image to a black and white image, whitening a face region in the image, inserting a character or a pre-manufactured object into a background of the image, reducing noise of the image, and compressing or reconstructing the image. As such, by applying a filter effect while capturing an image, a new experience may be provided to a user while capturing a photograph or a moving image.

The capturing controller 110 may capture a still image or a moving image. In other words, each of the first and second partial images may be a still image or a moving image. Alternatively, the capturing controller 110 may capture some of a plurality of partial images as still images and other some of the plurality of partial images as moving images. In other words, the capturing controller 110 may capture the first partial image as one of a still image and a moving image and may capture the second partial image as other one of the still image and the moving image. When there are at least two moving images from among a plurality of partial images captured by the capturing controller 110, the capturing controller 110 may capture the at least two moving images such that captured periods of time are the same. In other words, the capturing controller 110 may capture the first and second partial images at different times, and when the first and second partial images are both moving images, a captured period of time of the first partial image and a captured period of time of the second partial image may be the same (i.e., the first partial image and the second partial image are captured simultaneously). Accordingly, when the image processor 120 generates a collage image by merging the first and second partial images, a length of the collage image may be determined to be the same as each of the captured periods of time of the first and second partial images.

The capturing controller 110 may determine a shape of each of a plurality of partial images. Here, a shape of each partial image may denote a size of each partial image, a location of each partial image in a collage image, a proportion of each partial image in a collage image, or a geometric shape of each partial image. The capturing controller 110 may receive an input of selecting one of at least one collage patterns from a user, and the capturing controller 110 may determine a shape of each of a plurality of partial images according to the selected collage pattern. A method of receiving, by the capturing controller 110, an input of selecting one of at least one collage patterns from a user will be described later with reference to FIGS. 7A-D.

The capturing controller 110 may capture each of the first and second partial images by applying at least one of image cropping, image rotating, and image size or proportion scaling based on determined shapes of the first and second partial images. For example, when a shape of each partial image is determined to have a width direction longer than a height direction, the capturing controller 110 may crop a length of each partial image in a height direction, scale each partial image to lengthen in a width direction, or rotate each partial image in a certain angle. Accordingly, the capturing controller 110 may capture a partial image such that a blank space is not generated in a collage image that is generated later.

The capturing controller 110 may determine at least one of resolution, a bit rate, and a frame per second of each partial image based on a shape of each partial image. In other words, while capturing a plurality of partial images, the capturing controller 110 may determine at least one of resolution, a bit rate, and a frame per second of each of the plurality of partial images, and wherein the capturing controller 110 determines at least one of the resolution, the bit rate, and the frame per second based on a shape of each of the plurality of partial images.

The capturing controller 110 may determine at least one of resolution and a bit rate of each partial image in proportion to an area of each partial image. For example, when an area of the first partial image is twice an area of the second partial image, the capturing controller 110 may determine resolution or a bit rate of the first partial image to be twice the resolution of or a bit rate of the second partial image. Also, when the first partial image has a rectangular shape and a width thereof is three times longer than a height thereof or the number of pixels of the first partial image in a width direction is three times higher than the number of pixels of the first partial image in a height direction, the capturing controller 110 may determine a resolution of the first partial image such that a size of the first partial image in a width direction is three times larger than a size of the first partial image in a height direction. Accordingly, the capturing controller 110 may capture partial images having similar image qualities, and thus a calculation amount and processing times generated while the image processor 120 generates a collage image by merging the partial images may be reduced.

The capturing controller 110 may determine at least one of resolution, a bit rate, and a frame per second of each partial image based on performance of at least one of an apparatus capturing each partial image, an apparatus generating a collage image, and an apparatus reproducing a collage image. For example, a CPU of an apparatus generating a collage image may consume excessive time to generate a collage image at frames per second of at least 120 Hz. Also, a camera of an apparatus capturing a partial image may be unable to capture an image having resolution of 1920×1080 pixels. In this case, the capturing controller 110 may determine at least one of resolution, a bit rate, and a frame per second of each partial image by considering performance of each of an apparatus capturing a partial image, an apparatus generating a collage image, and an apparatus reproducing a collage image. Accordingly, a calculation amount and processing times generated while generating or reproducing a collage image may be reduced. Also, the capturing controller 110 may determine a frame per second based on a performance of at least one of an apparatus capturing a partial image, an apparatus generating a collage image, and an apparatus reproducing a collage image. Also, the capturing controller 110 may capture each of the first and second partial images based on a determined frame per second. In other words, the capturing controller 110 may capture all partial images to be merged into a collage image such that the partial images have the same frames per second. Accordingly, a calculation amount and processing times generated when a collage image is generated may be reduced, and in addition, the collage image may be a natural image.

While capturing each of a plurality of partial images, the capturing controller 110 may recognize a face from each photography area. For example, while capturing the first partial image, the capturing controller 110 may recognize a location of at least one face from within the photography area of the first partial image. Then, the capturing controller 110 may predict all or a part of a body region of a person having the recognized face based on the recognized face, and apply an image processing filter to at least one of the body region and a remaining region obtained by excluding the body region. A method of recognizing, by the capturing controller 110, a face and a body region from a photography area will be described later with reference to FIG. 8A-C.

The capturing controller 110 may include various units for receiving inputs from the user so as to capture an image. For example, the capturing controller 110 may include any one of, but not limited to, a keypad, a dome switch, a touch pad (a contact capacitance type, a pressure resistance film type, an infrared detecting type, a surface ultrasound conducting type, an integrated tension measuring type, or a piezo-effect type), a jog wheel, a jog switch, and a mouse.

The capturing controller 110 may receive or detect various types of inputs from the user for capturing an image. In detail, the capturing controller 110 may receive or detect an input for capturing an image. Also, the capturing controller 110 may receive or detect an input for capturing one of a moving image or a still image. At this time, the capturing controller 110 may receive or detect an input for selecting a resolution of an image, a shape of an image, a captured period of time of a moving image, a bit rate of a moving image, or an image processing filter to be applied to an image.

The image processor 120 may generate a collage image by directly merging partial images or control the terminal 10 to generate the collage image. Hereinafter, when the image processor 120 may perform a certain image processing operation, the image processor 120 may directly perform the certain image processing operation or may control the terminal 10 to perform the certain image processing operation.

After a plurality of partial images are captured, the image processor 120 may merge the plurality of partial images to generate a collage image. For example, the image processor 120 may generate a collage image by merging the first and second partial images at a third time after the first time when the capturing controller 110 captures the first partial image and the second time when the capturing controller 110 captures the second partial image. At this time, when the first and second partial images are both still images, the image processor 120 may generate the collage image in a still image. When the first and second partial images are both moving images, the image processor 120 may generate the collage image in a moving image. When one of the first and second partial images is a still image and the other one is a moving image, the image processor 120 may process the still image as a moving image without a change, and generate the collage image in a moving image.

The image processor 120 may merge partial images by applying each of at least one of image cropping, image rotating, and image size or proportion scaling to each of the partial images based on a determined shape of each of the partial images. For example, when a shape of each partial image is determined to have a width direction longer than a height direction, the image processor 120 may crop each partial image in a height direction, scale a proportion of each partial image to length in a width direction, or rotate each partial image in a certain angle. Accordingly, the image processor 120 may generate a collage image without a blank space.

The image processor 120 may decode partial images captured by the capturing controller 110. In this case, the image processor 120 may decode a partial image that is already captured while the capturing controller 110 captures another partial image. In other words, a period of time the image processor 120 decodes the first partial image may at least partially overlap with a period of time the capturing controller 110 captures the second partial image. Accordingly, time consumed to decode a plurality of partial images that are components of a collage image may be reduced. After the partial images are decoded, the image processor 120 may generate one collage image by connecting and encoding the decoded partial images.

When a collage image is not generated within a certain period of time after some or all of the partial images have been captured, the image processor 120 may delete the partial images. For example, when the capturing controller 110 does not start capturing the second partial image within a first threshold time after capturing the first partial image at the first time, the image processor 120 may delete the first partial image. As another example, when a command to generate a collage image is not received within a second threshold time after the capturing controller 110 captured the first and second partial images, the image processor 120 may delete the first and second partial images. Alternatively, the second partial image may be automatically captured after the first threshold time. The first time, the second time, the first threshold time, the second threshold time, and an operation of deleting a previous image or automatically capturing a next image after a threshold time may be pre-set by the user and may be adjustable.

The capturing controller 110 and/or the image processor 120 may include any type of apparatus for processing data, such as a processor. Also, the capturing controller 110 and the image processor 120 may be two hardware apparatuses, such as processors, which are physically separated from each other, logical units realized in one hardware apparatus, or two hardware apparatuses connected to each other. Some functions of the capturing controller 110 and the image processor 120 may be performed through another apparatus. For example, the image processor may apply an image processing filter to an electronic image converted to an electric signal through the capturing controller 110.

Figure 2:
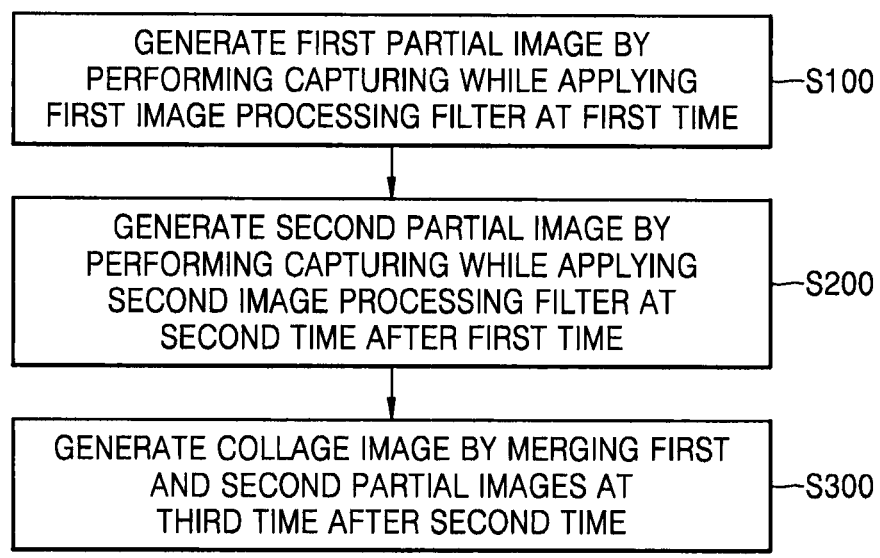
FIGS. 2 through 4 are flowcharts of an image providing method according to example embodiments.
Figure 3:
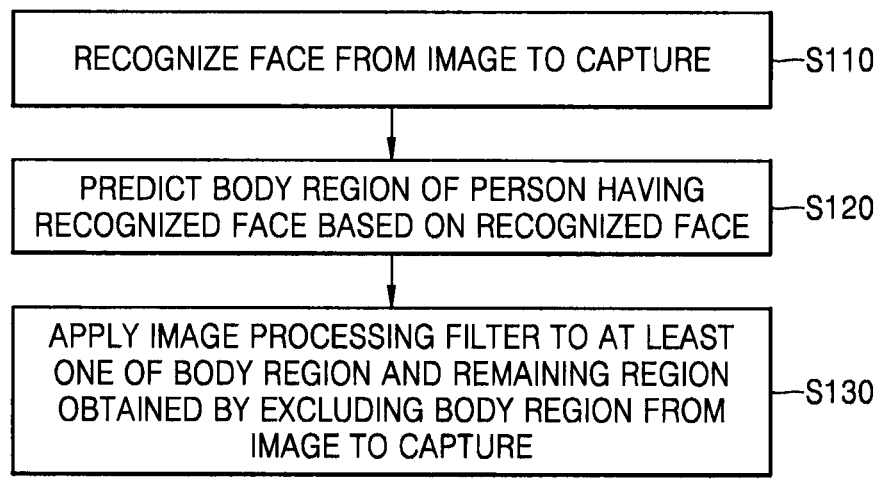
Figure 4:
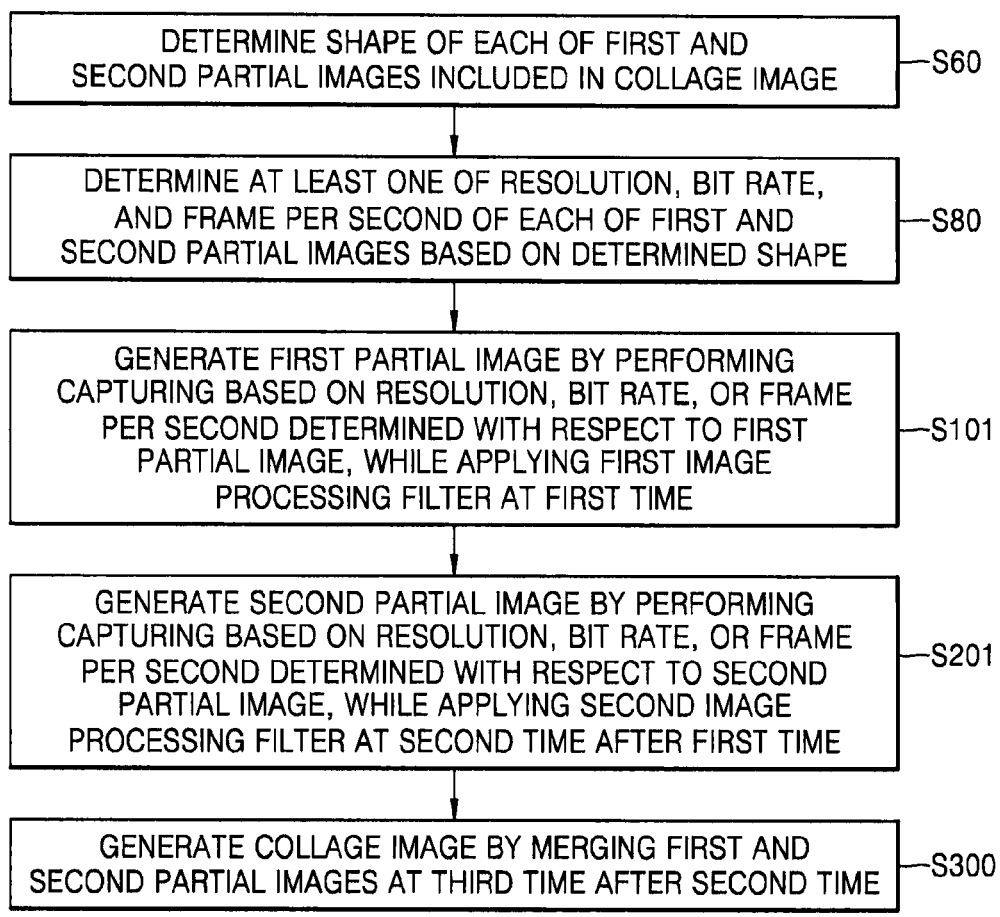

FIGS. 2 through 4 are flowcharts of an image providing method according to example embodiments.

The image providing method of FIGS. 2 through 4 includes operations that are performed in time-series by the image providing device 100 of FIG. 1. Accordingly, details described above with reference to FIG. 1 may be applied to the image providing method of FIGS. 2 through 4, even if omitted.

Referring to FIG. 2, the image providing method according to an example embodiment may include generating a first partial image by performing image capturing while applying a first image processing filter at a first time (operation S100), generating a second partial image by performing image capturing while applying a second image processing filter at a second time after the first time (operation S200), and generating a collage image by merging the first and second partial images at a third time after the second time (operation S300).

While capturing a plurality of partial images, an apparatus performing the image providing method may apply an image processing filter by classifying a region where a person is located in a photography area and a background region. For example, referring to FIG. 3, in the image providing method according to an example embodiment, operation S100 or S200 may include recognizing a face from a photography area (operation S110), predicting a body region of a person having the recognized face based on the recognized face (operation S120), and applying an image processing filter to at least one of the body region and a remaining region obtained by excluding the body region from the photography area (operation S130).

Also, an apparatus performing the image providing method may capture each partial image while considering a location or size of each partial image in a collage image. For example, referring to FIG. 4, the image providing method according to an example embodiment may further include determining a shape of each of the first and second partial images to be included in a collage image (operation S60), and determining at least one of resolution, a bit rate, and a frame per second of each of the first and second partial images based on the determined shape (operation S80). In this case, the image providing method according to an example embodiment may include generating the first partial image by performing capturing based on the resolution, the bit rate, or the frame per second determined with respect to the first partial image, while applying the first image processing filter at the first time (operation S101), generating the second partial image by performing capturing based on the resolution, the bit rate, the frame per second determined with respect to the second partial image, while applying the second image processing filter at the second time after the first time (operation S201), and generating the collage image by merging the first and second partial images at the third time after the second time (operation S300).

As described above, by pre-determining a shape of a collage image and determining resolution, a bit rate, or a frame per second of an image to be captured based on the determined shape, the collage image may be quickly generated compared to when pre-captured images are merged into a collage image.

FIGS. 5 through 8 are diagrams for describing examples of an image providing method performed by an image providing device, according to example embodiments.

Referring to FIGS. 5 through 8, the image providing device 100 according to an example embodiment may display, on the display unit 11 of the terminal 10, partial images being captured, and generate one collage image by merging the partial images.

Figures 5A, 5B, 5C, 5D:
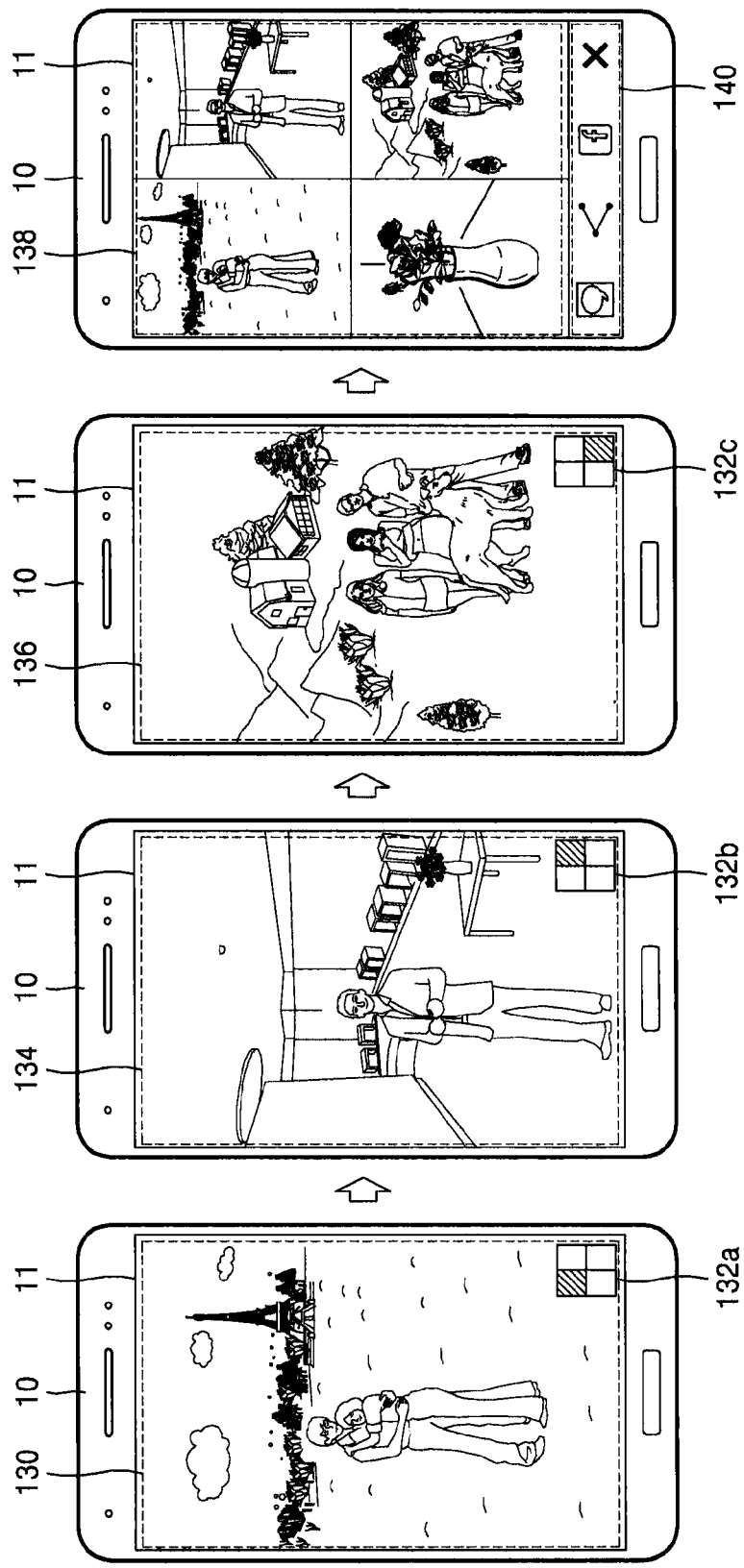

The image providing device 100 may capture partial images to be merged as parts of a collage image. Here, the image providing device 100 display a photography area or a partial image after capturing is completed. For example, as shown in FIG. 5A, the image providing device 100 may control the terminal 10 to display, on the display unit 11, a first partial image 130. At this time, the image providing device 100 may display an area in the collage image where a partial image currently being captured is to be merged. For example, the image providing device 100 may control the terminal 10 to display a merging location display user interface (UI) 132*a* on the display unit 11 of the terminal 10. The merging location display UI 132*a* may include four rectangles, wherein a top-left rectangle from among the four rectangles may have a color, a brightness, or an effect different from those of the other rectangles. In this case, the merging location display UI 132*a* may indicate that the collage image may be generated by merging four partial images, and the first partial image 130 may be located at the left top of the collage image. The image providing device 100 may receive a user input for capturing a partial image, and thus capture the partial image. A user input of capturing a partial image may be a user action of tapping, double-tapping, long-tapping, clicking, double-clicking, or clicking and then dragging with respect to a certain or arbitrary region on the display unit 11, a user action of pressing an arbitrary keyboard button, pressing a certain keyboard button, or making a certain air gesture, or an action of touching or pressing a certain region or a certain button on the image providing device 100 or the terminal 10, and may further be any one of various inputs the image providing device 100 may recognize as a command for capturing a partial image.

After capturing one partial image, the image providing device 100 may capture a next partial image. At this time as well, the image providing device 100 may display a photography area or the next partial image that is captured. For example, as shown in FIG. 5B, after the first partial image 130 is captured, the image providing device 100 may capture a second partial image 134, and control the terminal 10 to display the second partial image 134 on the display unit 11 of the terminal 10. At this time as well, the image providing device 100 may display an area in the collage image where a partial image currently being captured is to be merged. In other words, a merging location display UI 132*b* may indicate that the second partial image 134 may be located at the right top of the collage image. Similarly, as shown in FIG. 5C, the image providing device 100 may capture a last partial image 136, and may display a location of the last partial image 136 in the collage image through a merging location display UI 132*c*.

After all partial images are captured, the image providing device 100 may generate the collage image by merging the partial images. At this time, the image providing device 100 may automatically generate the collage image after all the partial images are captured, or may generate the collage image after receiving a user input of generating a collage image after all the partial images are captured. A user input of generating a collage image may be a user action of tapping, double-tapping, long-tapping, clicking, double-clicking, or clicking and then dragging with respect to a certain or arbitrary region on the display unit 11, a user action of pressing an arbitrary keyboard button, pressing a certain keyboard button, or making a certain air gesture, or an action of touching or pressing a certain region or a certain button on the image providing device 100 or the terminal 10, and may further be any one of various inputs the image providing device 100 may recognize as a command for generating a collage image.

The image providing device 100 may display the generated collage image. For example, as shown in FIG. 5D, the image providing device 100 may control the terminal 10 to display a collage image 138 generated by merging partial images, on the display unit 11 of the terminal 10. At this time, the image providing device 100 may display a UI 140 for processing the collage image 138. For example, the image providing device 100 may control the terminal 10 to display the UI 140 for processing the collage image 138 at the bottom of the display unit 11 of the terminal 10. The UI 140 may include UIs indicating functions, such as storing a collage image, permanently deleting a collage image, or sharing a collage image via a social network service (SNS). The image providing device 100 may receive a user input of processing the collage image 138, and process the collage image 138 according to the user input.

Figure 6:
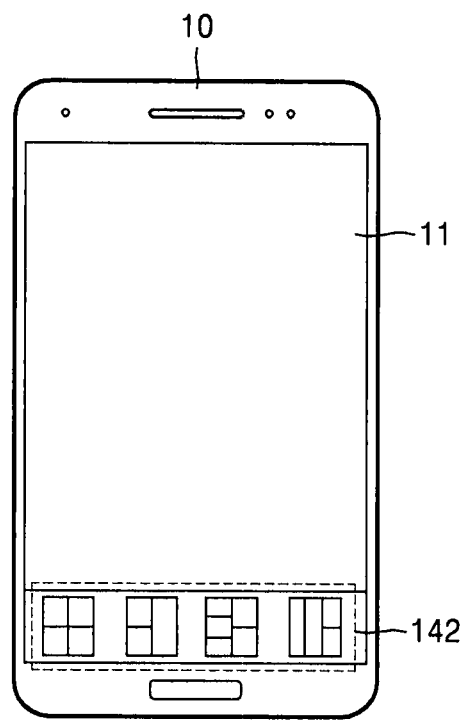

The image providing device 100 may receive a user input of selecting a shape of each partial image. For example, as shown in FIG. 6, the image providing device 100 may display a UI 142 for selecting a shape of each partial image, on the display unit 11 of the terminal 10. The UI 142 for selecting a shape of each partial image may include UIs having various shapes for a shape of each partial image. In detail, the UIs having various shapes for a shape of each partial image may each be a big polygon including several small polygons. Here, the big polygon may indicate a shape of a collage image and the several small polygons may indicate shapes of partial images. The image providing device 100 may receive a user input of selecting a certain shape, and capture partial images according to the user input. For example, when a user selects a big rectangle including four small rectangles, the image providing device 100 may generate four partial images in the small rectangles by performing capturing four times, and then generate a collage image in the big rectangle by merging the four partial images.

The image providing device 100 may determine at least one of resolution, a bit rate, or a frame per second of each partial image based on a determined shape of each partial image. At this time, the image providing device 100 may determine at least one of resolution and a bit rate of each partial image in proportion to an area of each partial image. Accordingly, when the image providing device 100 performs encoding to generate a collage image, processes of scaling a size of each partial image, adjusting a bit rate, and adjusting a length of an image may be simplified. As a result, the image providing device 100 may quickly generate a collage image after capturing partial images.

The image providing device 100 may display a photography area or a partial image after being captured, in a form different from FIGS. 5A-D. For example, as shown in FIG. 7A, the image providing device 100 may control the terminal 10 to display, on the display unit 11 of the terminal 10, a first partial image 144. In other words, the image providing device 100 may display the first partial image 144 at a location to be merged in a collage image 152. Similarly, as shown in FIGS. 7B and 7C, the image providing device 100 may capture second through fourth partial images 146 through 150 while displaying the second through fourth partial images 146 through 150 at locations to be merged in the collage image 152. After capturing the first through fourth partial images 144 through 150, the image providing device 100 may generate the collage image 152. Also, the image providing device 100 may display the collage image 152. For example, as shown in FIG. 7D, the image providing device 100 may control the terminal 10 to display the collage image 152 on the display unit 11 of the terminal 10, and to display a UI 154 for processing the collage image 152.

Figure 8C:
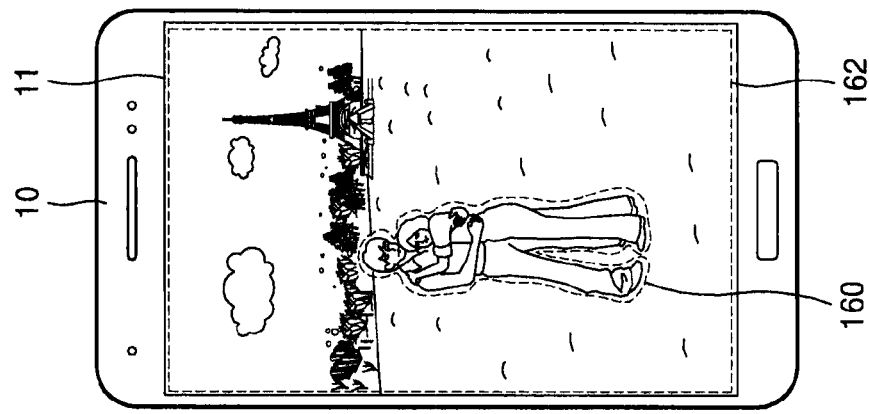
Figure 8B:
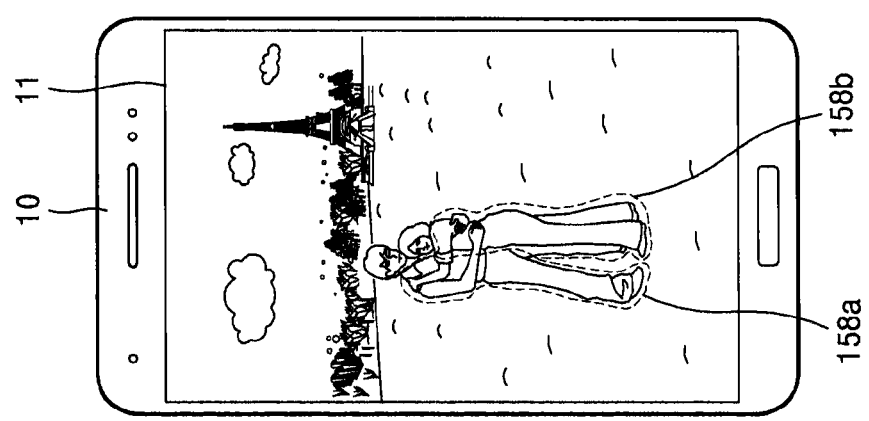
Figure 8A:
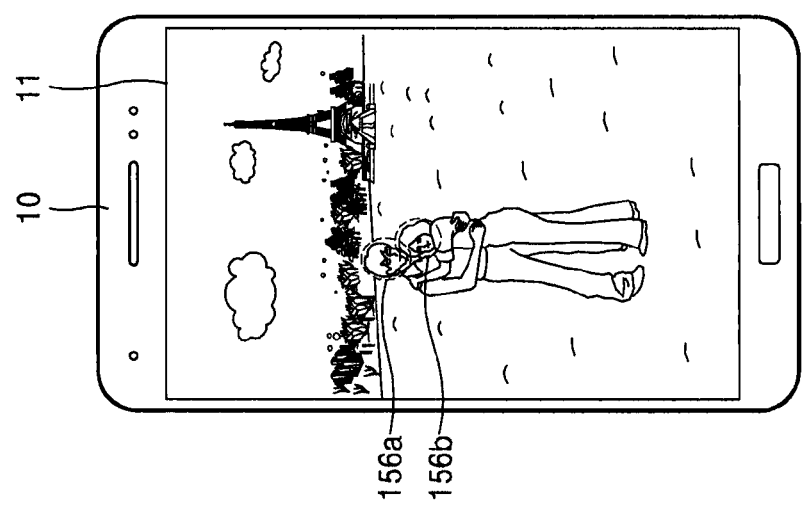

The image providing device 100 may predict a person region of a person from a photography area while capturing each partial image. The person region may be predicted by the image providing device 100 by recognizing a face of the person and predicting a body person region from the recognized face. For example, as shown in FIG. 8A, the image providing device 100 may recognize locations of two faces 156a and 156b from a photography area. The image providing device 100 may recognize a face of a person via any one of various image processing algorithms, such as recognizing a color and recognizing a location of an eye, a nose, or a mouth.

After recognizing a face of a person, the image providing device 100 may predict a body person region based on the recognized face. For example, as shown in FIG. 8B, the image providing device 100 may predict body regions 158a and 158b of people from the photography area. Predicting of a body region may be performed based on a recognized face of a person. For example, when a face of a person is displayed in a photography area, the image providing device 100 may predict a direction in which a body person region would exist based on a location of an eye, a nose, or a mouth of the person. Then, the image providing device 100 may set a location assumed to be the body person region. Then, the image providing device 100 may predict the body person region through a method of predicting a boundary between the body region and a background region by using any one of various image processing algorithms, such as edge detection. The image providing device 100 may predict a region including the recognized face and the body region as a person region.

At this time, the image providing device 100 may estimate only a part of the body region as the body region. For example, the image providing device 100 may recognize the face through the location of the eye, the nose, or the mouth of the person, and then predict an upper body person region as the body region based on the recognized face. As another example, the image providing device 100 may recognize the face through the location of the eye, the nose, or the mouth of the person, and then predict a location of a shoulder line of the person based on the recognized face. Then, the image providing device 100 may perform image cropping based on the shoulder line, thereby predicting a region above the shoulder line as the body region.

After predicting the person region, the image providing device 100 may apply a certain image processing filter to at least one of the person region and a remaining region obtained by excluding the person region from the photography area. For example, as shown in FIG. 8C, the image providing device 100 may classify the photography area into a person region 160 and a background region 162. Then, the image providing device 100 may apply a certain image processing filter to at least one of the person region 160 and the background region 162. Here, types of the certain image processing filter applied to the person region 160 and the background region 162 may be different from each other. For example, a blurring effect may be applied to the background region 162 such that the person region 160 is clarified whereas the background region 162 is blurred, or to the person region 160 such that the person region 160 is blurred compared to the background region 162. Alternatively, the color characteristics of the person region 160 and the background region 162 may be differently expressed. Accordingly, the image providing device 100 may provide various effects by classifying a person and a background from an image, and increase an aesthetic impression of the image. Also, when the image providing device 100 predicted an upper body region or a region up to a shoulder line of a person as a body region of the person, the image providing device 100 may provide an effect in which a face region of the person is further emphasized.

In order to enable such manipulations while performing capturing, near-professional manipulations, such as pre-adjusting an iris or an exposure level, are required in the case of a general camera. However, according to an example embodiment, an image having the above-described effects may be obtained while the image is captured via software manipulations.

The image providing device 100 according to an example embodiment may quickly generate a collage image by merging a plurality of partial images immediately after the plurality of partial images are captured. Also, the image providing device 100 according to an example embodiment may apply different image processing filters to partial images, and may apply different image processing filters to one image by classifying the image into a person region and a background region.

According to one or more example embodiments, an image providing method and an image providing device may capture a plurality of images and generate a collage image by applying same or different image processing filters to the plurality of images.

Also, an image providing method and an image providing device may pre-determine resolution, bit rate, or frame per second of each of a plurality of images that are to form a collage image, and generate a collage image by capturing a plurality of images corresponding to the pre-determined resolution, bit rate, or frame per second.

Also, an image providing method and an image providing device may apply various image processing filters to at least one of a person region and a background region in a captured image.

Also, an image providing method and an image providing device may reduce the time to create a collage image by decoding one partial image and capturing the other partial image at the same time.

The methods described above may be recorded on a computer-readable recording medium by being realized in computer programs executed by using various computers and/or at least one processor. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured as one or more modules/units to perform the operations of the above-described example embodiments, or vice versa.

The particular implementations shown and described herein as example embodiments are illustrative only and are not intended to otherwise limit the scope of the present disclosure in any way. For the sake of brevity, conventional electronics, control systems, software development and other functional aspects of the systems (and components of the individual operating components of the systems) have not been described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical".

While one or more example embodiments have been described with reference to the figures, it will be understood by those of ordinary skill in the art that various changes in form and details may be made therein without departing from the spirit and scope of inventive concepts as defined by the following claims.

What is claimed is:

1. An image providing method comprising:
    capturing, by a processor, a first partial image while applying a first image processing filter at a first time;
    capturing, by the processor, a second partial image while applying a second image filter at a second time after the first time;
    generating, by the processor, a collage image by merging the first partial image and the second partial image at a third time after the second time;
    determining, by the processor, a shape of each of the first and second partial images included in the collage image before the capturing of the first partial image; and
    determining, by the processor, at least one of a resolution, a bit rate, and a frame per second of each of the first and second partial images based on the determined shape,
    wherein each of the capturing the first partial image and the capturing the second partial image is performed based on the determined at least one of the resolution, the bit rate, and the frame per second of the corresponding one of the first and second partial images.

2. The image providing method of claim 1, wherein the determining the shape comprises:
    receiving an input for selecting at least one collage pattern; and
    determining the shape of each of the first partial image and the second partial image according to the selected at least one collage pattern.

3. The image providing method of claim 2, wherein each of the capturing of the first partial image and the capturing of the second partial image captures the corresponding one of the first partial image and the second partial image by applying at least one effect based on the determined shape of the first partial image and the second partial image, the at least one effect being selected from among an image cropping effect, and image rotating effect, and image size effect or a proportion scaling effect.

4. The image providing method of claim 2, wherein the generating the collage image comprises:
    generating the collage image by applying at least one effect to each of the first and second partial images based on the determined shape of the first partial image and the second partial image, the at least one effect being selected from among an image cropping effect, and image rotating effect, and image size effect or a proportion scaling effect.

5. The image providing method of claim 1, wherein the determining the at least one of the resolution, the bit rate, and the frame per second determines at least one of the resolution and the bit rate of each of the first and second partial images in proportion to an area of each of the first and second partial images.

6. The image providing method of claim 1, wherein the determining the at least one of the resolution, the bit rate, and the frame per second determines at least one of the resolution, the bit rate, and the frame per second of each of the partial images based on a performance of at least one of an apparatus capturing the first and second partial images, an apparatus generating the collage image, and an apparatus reproducing the collage image.

7. The image providing method of claim 1, wherein each of the capturing the first partial image and the capturing the second partial image comprises:
    recognizing a face from a photography area of at least one of the first partial image and the second partial image;
    predicting a body region of a person having the recognized face, based on the recognized face in the at least one of the first partial image and the second partial image; and
    applying an image processing filter to at least one region from among the body region and a remaining region obtained by excluding the body region from the photography area of the at least one of the first partial image and the second partial image.

8. The image providing method of claim 1, further comprising:
    decoding, by the processor, the first partial image after the capturing of the first partial image,
    wherein a period of time during which the decoding decodes the first partial image at least partially overlaps with a period of time during which the capturing the second partial image captures the second partial image.

9. The image providing method of claim 1, further comprising:
    deleting the first partial image when the capturing the second partial image does not initiate capturing the second partial image within a first threshold time after the first time.

10. The image providing method of claim 1, wherein each of the first and second partial images is a still image or a moving image.

11. The image providing method of claim 1, wherein
    the first partial image is one of a still image and a moving image, and
    the second partial image is the other one of the still image and the moving image.

12. The image providing method of claim 1, wherein the first and second partial images are moving images captured simultaneously.

13. The image providing method of claim 1, wherein a resolution of the collage image is equal to a sum of a resolution of the first partial image and a resolution of the second partial image.

14. The image providing method of claim 1, further comprising:
    capturing a third partial image while applying a third image processing filter at a fourth time after the second time, after the capturing of the first partial image,
    wherein the generating the collage image includes generating the collage image by merging the first partial image, the second partial image and the third partial image at the third time after the fourth time.

15. A non-transitory computer-readable recording medium storing instructions, which when executed by a processor causes the processor to perform the method of claim 1.

16. An image providing device comprising:
a memory having computer-readable instructions stored therein; and
a processor configured to execute the computer-readable instructions to,
    capture a first partial image while applying a first image processing filter at a first time,
    capture a second partial image while applying a second image filter at a second time after the first time,
    generate a collage image by merging the first partial image and the second partial image at a third time after the second time,
    determine a shape of each of the first and second partial images,
    determine at least one of a resolution, a bit rate, and a frame per second of each of the first and second partial images based on the determined shape, and
    capture the first and second partial images based on the determined at least one of the resolution, the bit rate, and the frame per second.

17. The image providing device of claim 16, wherein the processor is further configured to,
    recognize a face from a photography area of at least one of the first partial image and the second partial image while capturing each of the first and second partial images,
    predict a body region of a person having the recognized face based on the recognized face in the at least one of the first partial image and the second partial image, and
    apply an image processing filter to at least one region from among the predicted body region and a remaining region obtained by excluding the predicted body region from the photography area of the at least one of the first partial image and the second partial image.

18. The image providing device of claim 16, wherein the processor is further configured to decode the first partial image,
    wherein a period of time during which the processor decodes the first partial image overlaps at least partially with a period of time during which the processor captures the second partial image.

* * * * *